United States Patent [19]

Suzuki

[11] Patent Number: 4,837,711
[45] Date of Patent: Jun. 6, 1989

[54] METHOD FOR DETECTING/PROCESSING IMAGE INFORMATION

[75] Inventor: Kenji Suzuki, Kaisei, Japan

[73] Assignee: Fuji Photo Film Co., Ltd., Ara, Japan

[21] Appl. No.: 854,560

[22] Filed: Apr. 21, 1986

[30] Foreign Application Priority Data

Apr. 20, 1985 [JP] Japan ............................ 60-85062
Apr. 20, 1985 [JP] Japan ............................ 60-85063
Jul. 9, 1985 [JP] Japan ............................ 60-151094

[51] Int. Cl.$^4$ .................................... G03B 27/52
[52] U.S. Cl. ............................ 364/523; 364/559; 355/38; 355/55
[58] Field of Search ............... 382/30, 45, 46, 48, 382/23; 355/35, 38, 55, 56; 364/523, 559; 378/99, 100; 358/288

[56] References Cited

U.S. PATENT DOCUMENTS

| 3,976,982 | 8/1976 | Eiselen | 382/46 X |
|---|---|---|---|
| 4,005,934 | 2/1977 | Wohlrab | 355/88 |
| 4,260,244 | 4/1981 | Laska et al. | 355/35 |
| 4,342,090 | 7/1982 | Caccoma et al. | 364/559 X |
| 4,344,704 | 8/1982 | Thurm et al. | 355/35 X |
| 4,344,708 | 8/1982 | Tokuda | 355/35 X |
| 4,435,837 | 3/1984 | Abernathy | 382/45 X |
| 4,547,800 | 10/1985 | Masaki | 382/30 X |
| 4,610,537 | 9/1986 | Matsumoto | 355/68 |
| 4,630,225 | 12/1986 | Hisano | 382/48 X |
| 4,641,244 | 2/1987 | Wilson et al. | 364/559 X |
| 4,650,316 | 3/1987 | Matsumoto | 355/55 |
| 4,659,213 | 4/1987 | Matsumoto | 355/38 |
| 4,660,965 | 4/1987 | Matsumoto | 355/41 |
| 4,666,306 | 5/1987 | Matsumoto | 356/404 |
| 4,666,307 | 5/1987 | Matsumoto et al. | 356/404 |
| 4,667,245 | 5/1987 | Matsumoto et al. | 358/214 |
| 4,672,462 | 6/1987 | Yamada | 382/46 X |
| 4,672,562 | 6/1987 | Egli et al. | 364/559 |
| 4,672,564 | 6/1987 | Egli et al. | 364/559 |
| 4,713,784 | 12/1987 | Ayata | 364/559 |
| 4,723,221 | 2/1988 | Matsuura et al. | 364/559 |

Primary Examiner—Gary V. Harkcom
Assistant Examiner—Mark K. Zimmerman
Attorney, Agent, or Firm—Wenderoth, Lind & Ponack

[57] ABSTRACT

In photographic printing systems, it is necessary to detect image information of an original film to determine printing exposure amount for optimum prints. When an image sensor is used as a detector or for detecting image information, the detection area in the image sensor should correspond exactly with the detected area on the film. Particularly, when images are measured by separation into three colors of RGB (Red, Green, Blue), color registration among RGB should be attained. Image information can be automatically and accurately detected and processed without needing mechanical positional adjustment of the image sensor(s).

11 Claims, 12 Drawing Sheets

FIG. 3
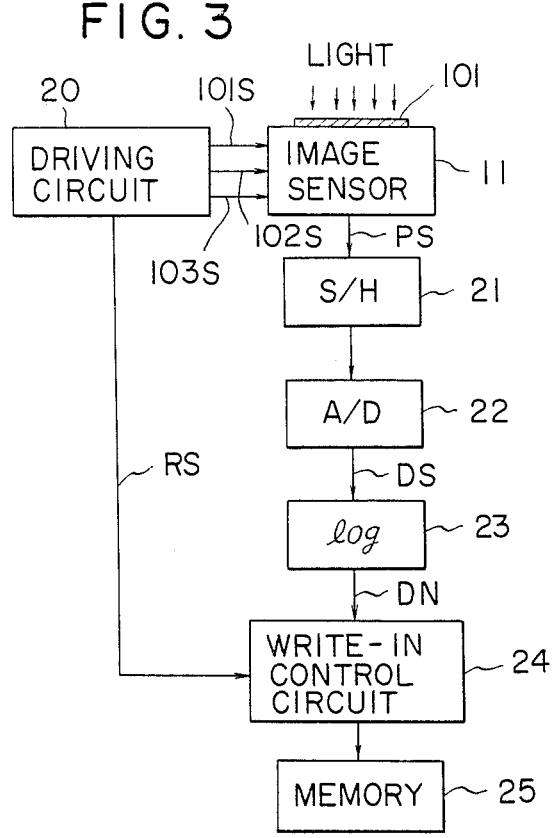
FIG. 4A
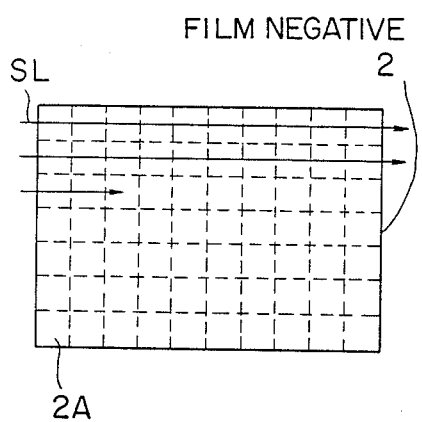
FIG. 4B
| 16 | 59 | 58 | 55 | 43 | 31 |
|----|----|----|----|----|----|
| 12 | 57 | 56 | 55 | 58 | 13 |
| 17 | 55 | 55 | 51 | 56 | 16 |
| 15 | 52 | 52 | 47 | 53 | 20 |
| 14 | 49 | 48 | 46 | 49 | 23 |
| 12 | 47 | 46 | 45 | 49 | 27 |
| 5  | 17 | 17 | 16 | 45 | 30 |

| 32 | 36 | 35 | 33 | 31 | 37 | 36 | 37 | 35 | 40 |
|----|----|----|----|----|----|----|----|----|----|
| 30 | 5  | 4  | 3  | 2  | 5  | 4  | 6  | 8  | 42 |
| 33 | 0  | 0  | 0  | 0  | 0  | 0  | 0  | 0  | 39 |
| 34 | 0  | 0  | 0  | 0  | 0  | 0  | 0  | 0  | 37 |
| 35 | 0  | 0  | 0  | 0  | 0  | 0  | 0  | 0  | 36 |
| 36 | 0  | 0  | 0  | 0  | 0  | 0  | 0  | 0  | 37 |
| 36 | 0  | 0  | 0  | 0  | 0  | 0  | 0  | 0  | 39 |
| 35 | 0  | 0  | 0  | 0  | 0  | 0  | 0  | 0  | 40 |
| 34 | 0  | 0  | 0  | 0  | 0  | 0  | 0  | 0  | 42 |
| 35 | 7  | 6  | 5  | 5  | 6  | 5  | 4  | 6  | 43 |
| 36 | 38 | 39 | 40 | 42 | 44 | 43 | 42 | 40 | 42 |

SA, PA

SAC, PAC

FIG. 9A
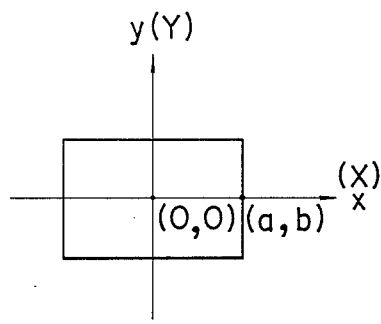
FIG. 9B
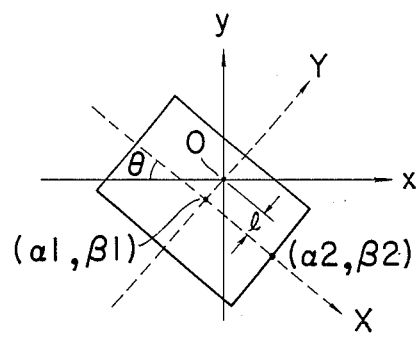
FIG. 11
| MEMORY ADDRESS | SENSOR COORDINATE | FRAME COORDINATE |
|---|---|---|
| 1 | 1 , 1 | |
| 2 | 1 , 2 | |
| 3 | 1 , 3 | |
| 4 | 1 , 4 | 1 , 1 |
| 5 | 1 , 5 | 1 , 2 |
| ⋮ | ⋮ | ⋮ |
| n×(m−1) | n , (m−1) | |
| n×m | n , m | |

FIG. 17

| MEMORY ADDRESS | SENSOR COORDINATE | 135F | | 110 | | 126 | | DISC | |
|---|---|---|---|---|---|---|---|---|---|
| | | LATERAL | LONGI-TUDINAL | LATERAL | LONGI-TUDINAL | LATERAL | LONGI-TUDINAL | LATERAL | LONGI-TUDINAL |
| 1 | 1,1 | AD1 | AD2 | AD3 | AD4 | AD5 | AD6 | AD7 | AD8 |
| 2 | 1,2 | | | | | | | | |
| 3 | 1,3 | | | | | | | | |
| 4 | 1,4 | | | | | | | | |
| 5 | 1,5 | | | | | | | | |
| 6 | 1,6 | | | | | | | | |
| --- | --- | | | | | | | | |
| n×m | n,m | | | | | | | | |

METHOD FOR DETECTING/PROCESSING IMAGE INFORMATION

BACKGROUND OF THE INVENTION

This invention relates to a method for detecting/processing color image information which is capable of precisely and automatically detecting the image information in color registration on a color original film without positional adjustment of image sensors even if the sensors are provided separately for each of plural colors.

In a photograhic printing system, it is necessary to photometrically measure the density of an original film (i.e. a film negative formed by developing a film negative) to determine its exposure amount or correction amount for printing. The density of the film negative is conventionally measured in LATD (Large Area Transmittance Density) with photosensors such as photodiodes provided near the optical path of a printing optical system. However, since the LATD image detection is a method for measuring the average density of the film negative in average but not for accurately measuring it across a frame, the printing exposure or correction is not quite precisely determined.

FIG. 1 shows a system which is proposed by this applicant to solve such problems encountered in the prior art.

A film negative 2 is conveyed by a conveying mechanism 9 to a position on a film negative carrier 1. The film negative 2 is illuminated with the light from a light source 4 via a color compensation means 3 which comprises 3 color filters of yellow (Y), magenta (M) and cyan (C). The light transmitted through the film negative 2 is directed to reach a photographic paper 7 via a lens unit 5 and a black shutter 6. The photographic paper 7 is wound around a supply reel 7A and reeled on a take-up reel 7B in synchronism with the movement and suspension of movement of the film negative 2. Photosensors 8 such as photodiodes are provided near the lens unit 5 of the film negative 2 in order to detect image density information of the three primary colors. Utilizing the detection signals from such photosensors 8, picture printing is carried out. An image information detecting apparatus 10 comprising a two-dimensional image sensor 11 is operatively positioned near the film negative 2 at a position inclined from an optical axis LS of the light source 4 and the film negative 2. A lens unit 12 is provided in front of the two-dimensional image sensor 11 to substantially focus the center area of the film negative 2. On the back of the image information detecting apparatus 10 is attached a substrate board 13 for mounting a processing circuit comprising integrated circuits and so on.

The two-dimensional image sensor 11 comprises, as shown in FIG. 2, an image pickup section 101 for optically picking up an image, a storage section 102 for storing charges transmitted from the image pickup section 101, and an output register 103 for outputting the charges stored in the storage section 102. By controlling driving signals 101S through 103S from a driving circuit, the image information in two-dimensions (area) is photo-electrically converted and outputted serially from the output register 103 in the form of an analog image signal PS. The circuit mounted on the substrate board 13 has, for example, a circuit structure shown in FIG. 3. The image sensor 11 is driven by driving signals 101S through 103S supplied from the driving circuit 20.

The light illuminating the image pickup section 101 of the image sensor 11 is outputted from the output register 103 as a picture signal PS, sampled and held by a sample-and-hold circuit 21 at a predetermined sampling cycle. The sample value thereof is converted by an analog-to-digital (A/D) converter 22 into digital signals DS. The digital signals DS from the A/D converter 22 are inputted into a logarithmic converter 23 for logarithmic conversion, then converted to density signals DN, passed through a write-in control circuit 24 and finally written in a memory 25.

A reading speed signal RS from the driving circuit 20 is inputted into the write-in control circuit 24 in order to read out image information at a predetermined speed when the image sensor 11 is driven. The write-in control circuit 24 writes in the density signals DN at predetermined positions of a memory sequentially and corresponding with the driving speed (i.e.—the scanning speed across the face thereof) of the image sensor 11. In other words, the reading speed of the image sensor 11 is determined by the driving speed. The reading speed in turn determines the segmentation number of picture elements with respect to an image area. The memory 25 should therefore store the detected information in correspondence with the number of pixels, too.

When a picture is printed in a conventional manner in the above mentioned structure, the light transmitted through one frame of a film negative 2 which has been conveyed to and standing still at a printing position is detected by photosensors 8. Then, the filters in the color compensation means 3 are adjusted in response to the picture signals for each of the primary RGB colors and the black shutter 6 is opened to expose a photographic paper 7 with the determined exposure amount.

An image information detecting apparatus 10 comprising a two-dimensional image sensor 11 of area scanning type such as a CCD is mounted at a position near the film negative 2 at an inclined angle with respect to the optical axis LS to facilitate mounting operation. The whole frame of the film negative 2 is segmented into a large number of arrayed pixels for detecting image information. In other words, when predetermined driving signals 101S through 103S are fed from the driving circuit 20 to the image sensor 11, the two-dimensional image sensor 11 is adapted to receive the light transmitted through the film negative 2 on the printing section via the lens unit 12. The two-dimensional image sensor 11 can therefore scan the whole surface of a frame of the film negative 2 along scanning lines SL sequentially by segmenting the whole area into a large number of small pixels 2A as shown in FIG. 4A. After the whole area has been scanned, the output register 103 of the image sensor 11 outputs picture signals PS sequentially, then the picture signals PS are sampled and held by a sample-and-hold circuit 21 and the sampled values thereof are converted by an A/D converter 22 into digital signals DS. The digital signals DS from the A/D converter 22 are logarithmically converted by a logarithmic converter 23 to density signals DN. The density signals DN are input to a write-in control circuit 24 to be stored in a memory in the arrays corresponding to the pixels 2A shown in FIG. 4B and in terms of the density digital values of the film negative 2.

If the digital values for respective pixels of the film negative 2 or the density values for respective pixels with respect to the three primary colors RGB are stored in the memory 25, it is possible to read out the digital values for any particular pixel of the film negative 2 out of the memory 25. If the density values for the respective three primary colors of R, G and B, which are obtained using mosaic filters (not shown) are stored as shown in FIG. 4B, it is possible to read out such values from the memory for processing (which will be described hereinafter) in order to determine the exposure or correction amount for photographic printing in the same manner as in the prior art.

In such a method for measuring the density of the film negative 2, accurate image processing cannot be conducted unless each imaged frame corresponds to an image sensor area or unless the center of each imaged frame coincides with the center of the image sensor 11 constantly; FIG. 5 shows the state where the center SAC of the sensor area SA of the image sensor 11 coincides with the center PAC of the image area PA in a frame of the film negative 2. However, in practice they are often deviated (by the distance λ) from each other even though they remain within the scope of mechanical tolerance or the sensor area SA of the image sensor 11 is inclined from the image area PA (by the angle θ). In the prior art system, it is necessary to positionally adjust the attachment of the image information detecting device 10 minutely to cause the center SAC of the sensor area SA to coincide with the center PAC of the image area PA (in other words to make the distance λ zero) and the angle θ zero. The attachment and adjustment of the device requires much labor and further, since it needs an additional system for mechanical minute adjustment, it becomes a factor to push up the costs. There has long been awaited a solution for the problem.

In the operation of detecting color image information from a color film negative as shown in FIG. 7, the light of the primary color B out of the light which is transmitted through a film negative 30 is focused on an image sensor 35 by a lens unit 32, and dichroic filter mirrors 33 and 34 are operatively provided in the optical path between the lens unit 32 and the image sensor 35 so that the light of the primary color R which is the light reflected from the dichroic filter mirror 33 is received by an image sensor 37. The light of the primary color G which is the light reflected from the dichroic filter mirror 34 is received by an image sensor 36. When the light from the film negative 30 in three primary color separations is received respectively by one of the three image sensors 35 through 37 (i.e.—sensor 35 is for B, 36 for G, and 37 for R) and stored in a memory in pixels for each of the three primary colors, the sensor address of the image sensors 35 through 37 should be made to precisely coincide with the position of frame images of the film negative 30. For instance, as shown in FIG. 8, if it is assumed that the image sensor 35 of the primary color B has the scope BMA for receiving light, when the scope of the image sensor 36 of the color G is deviated from the scope BMA laterally by a and vertically by b to become situated as RMA, the image sensors 35 through 37 scan different locations on the same film to store them in digital form in a memory. Since these stored images are not aligned positionwise in detection, colors do not come to be in registration to disturb image processing. The positions of two-dimensional image sensors 35 through 37 which receive the image light in three color separation should be aligned to correspond to the same location on images of the film negative 30. The detection areas thereof are aligned by minute positional adjustment in the prior art. This adjustment involves not only cumbersome works but requires also complicated mechanical systems.

Moreover, in the photographic printing system where the direction in the feeding of photographic paper is switched between longitudinal and lateral directions, the sensor area should be adjusted to have its center coincide with the center of image area in both directions.

SUMMARY OF THE INVENTION

This invention was conceived in order to obviate aforementioned problems encountered in the prior art, and aims to provide a method for detecting/processing image information which is capable of automatically correcting mechanical deviation in position by means of software without the necessity of positional adjustment mechanism or positional adjustment of image sensors, by detecting deviation amount between the sensor addresses of image sensors and the frame addresses of detected frames and converting the sensor addresses in pixel data detected by image sensors into frame addresses.

Another object of this invention is to provide a method for detecting/processing color image information which is capable of detecting color images in color registration by detecting deviation amounts between the respective sensor addresses of image sensors which are provided to separate color images into plural colors and the frame addresses of detected images and converting the sensor addresses in pixel data detected by respective image sensors into frame addresses thereby to obviate mechanical deviation in positions of the image sensors.

Still another object of this invention is to provide a method for detecting/processing image information which is capable of automatically correcting mechanical deviation of image sensors in position by means of software but without the necessity of positional adjustment mechanism by detecting the amount of deviation between the sensor addresses of image sensors and frame addresses of a detected frame, calculating data to obtain a start address where data on a specific point (for instance, the spot to be scanned first in an effective frame) of respective effective frames both in longitudinal and lateral directions are stored and processing the data for both directions and sizes.

According to one aspect of this invention, for achieving the objects described above, there is provided a method for detecting/processing image information comprising the steps of receiving light from images with an image sensor, digitally detecting for each pixel the image information of the whole area through which said image sensor receives light, storing the information in a memory and processing said stored data, in which memory addresses on data tables are corresponded with sensor coordinate of said image sensor, a reference film negative having a mark at a reference position is photometrically measured by said image sensor, the amount of deviation between a position on the sensor coordinate corresponding to said reference position of said reference film negative when there is no deviation between said sensor coordinate and frame coordinate and said reference position on said sensor coordinate, if deviated, is calculated, values on said frame coordinate corresponding to each pixel point on said sensor coordinate are calculated to be written in said data tables, and said detected images are photometrically measured with said image sensor to be stored in said memory and simultaneously are processed in accordance with the memory addresses on said frame coordinate obtainable by referring to said data tables.

According to another aspect of this invention, there is provided a method for detecting/processing color image information comprising the steps of separating the light from color images which contains all colors into separate monochromatic beams of plural colors, respectively receiving the separated lights with plural image sensors, digitally detecting, or a pixel by pixel basis, the image information of the whole area where said image sensors receive the light and storing the digitally detected image information in a memory and processing said stored data, in which memory addresses on data tables of plural colors correspond to sensor coordinates of respective image sensors, a reference film negative having a mark at a reference position is photometrically measured respectively by said image sensors, the amount of deviation between a position on the sensor coordinate corresponding to said reference position of said reference film negative when there is no deviation between said sensor coordinate and frame coordinate and said reference position on said sensor coordinate if deviated, is calculated, values on said frame coordinate corresponding to each pixel point on said sensor coordinate are calculated to write in said data tables, said detected images are photometrically measured respectively by said image sensors and stored in said memory, and color images are processed in accordance with the memory address on said respective frame coordinate obtainable by referring to said data tables.

Furthermore, according to still another aspect of this invention, there is provided a method for detecting/processing image information comprising the steps of receiving light from images with an image sensor, digitally detecting for each pixel the image information of the whole area through which said image sensor receives light, storing the information in a memory and processing said stored data, in which memory addresses on a first data table correspond to sensor coordinates of said image sensor, a reference film negative having a mark at a reference position is photometrically measured by said image sensor, the amount of deviation between a position on the sensor coordinate corresponding to said reference position of said reference film negative when there is no deviation between said sensor coordinate and frame coordinate and said reference position on said sensor coordinate if deviated is calculated, positional data on said size information is read out from said first data table for each feeding direction and for each size, start addresses where a specific point on the effective area for each case is stored is obtained from said calculated amount of deviation written in a second data table, images are photometrically measured by said image sensor and stored in said memory in the case of ordinary measurement, and images are processed in accordance with the start addresses on said frame coordinate obtainable by referring to said second data table.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a block diagram of the control system of the two-dimensional image sensor;

FIGS. 4A and 4B are explanatory diagrams which describe the correspondence between pixel segmentation of the original film and stored data thereof;

FIGS. 9A and 9B are explanatory diagrams for explaining the deviation between sensor coordinates and frame coordinates;

FIG. 11 is an explanatory chart of a data table;

FIG. 17 is a chart which shows an example of data table;

DESCRIPTION OF THE PREFERRED EMBODIMENTS

According to this invention, a reference position is determined in advance for a color image area by means of a reference film negative, for example, detected images on the film negative are photometrically measured by respective image sensors of plural colors such as the three primary colors to detect the positional deviation at a particular position from the reference position, and the positional deviation on each sensor area is corrected for color registration. Data tables are prepared for each color in advance in order to indicate which sensor address of a pixel position on each two-dimensional image sensor corresponds to a position on a frame (frame coordinates). When a film negative is photometrically measured, it is at the same time processed according to the address on the frame coordinate obtainable by referring to such data tables. The number of reference positions may be one (for example, at the center point of the frame) if there are deviations only in the longitudinal and lateral directions but not angular. But if there is an angular deviation, too, the number of reference positions must be two or more. A description is provided below for the case where two reference positions are needed.

When the reference positions on the film negative or actual images are photometrically measured with two-dimensional image sensors, and if the sensor coordinates x-y coincides with the frame coordinates X-Y as shown in FIG. 9A, the obtained data are used in processing as is. If the sensor coordinates x-y are deviated from the frame coordinates X-Y as shown in FIG. 9B, the amount of deviation (deviation λ in both longitudinal and lateral directions of X and Y, and inclination angle θ) is obtained to re-write the data table so that the image data may be processed in the position as shown in FIG. 9A. By processing it for all the three primary colors, scanning areas are made to be coincidental to each other over the whole frame.

If the sensor coordinate and the frame coordinate are deviated by the angle θ (for the point α1, β1) as shown in FIG. 9B, the relationship below holds between a point (Xi, Yi) on the frame coordinate X-Y and a point (xi, yi) on the sensor coordinate x-y;

$$\begin{bmatrix} Xi \\ Yi \end{bmatrix} = \begin{bmatrix} \cos\theta & \sin\theta \\ -\sin\theta & \cos\theta \end{bmatrix} \begin{bmatrix} xi - \alpha1 \\ yi - \beta1 \end{bmatrix} \quad (1)$$

and the inclination angle θ is expressed as $$\theta = \sin^{-1} \frac{\beta2 - \beta1}{\alpha2 - \alpha1} \quad (2)$$

and therefore, each measured data for respective pixels can be transformed from the sensor coordinates to frame coordinates. If there is no deviation in inclination, θ is simply set equal to 0 such that $\cos\theta=1$, $\sin\theta=0$, and the expression (1) can be calculated.

Figure 10:
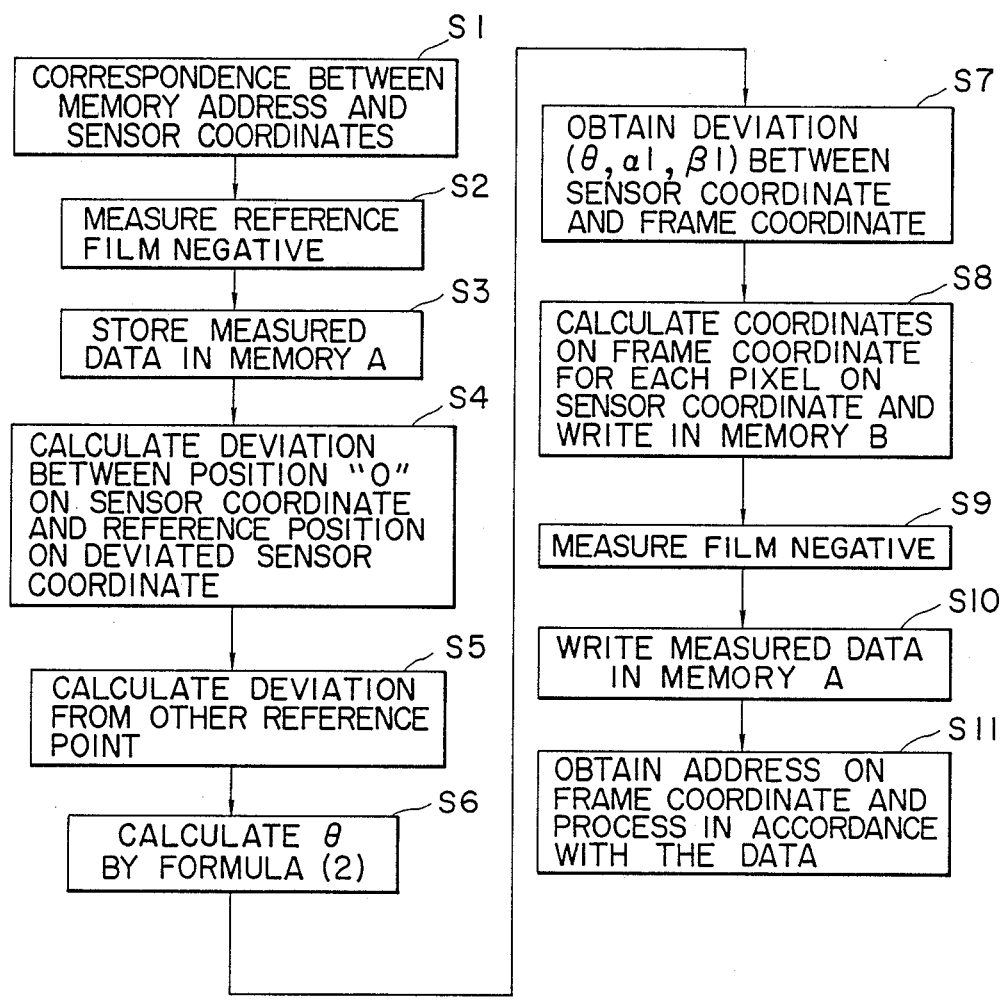
FIG. 10 is a flow chart which shows an example of operation according to this invention.
Figure 12:
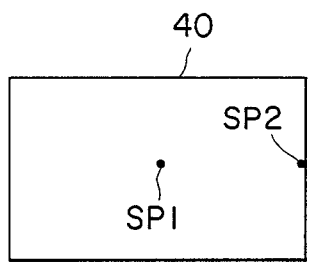
FIG. 12 is an explanatory diagram which shows the detection of the reference position.

The present invention will now be explained by referring to the flow chart with FIG. 10. The operation will be described in respect to one color herein.

Figure 1:
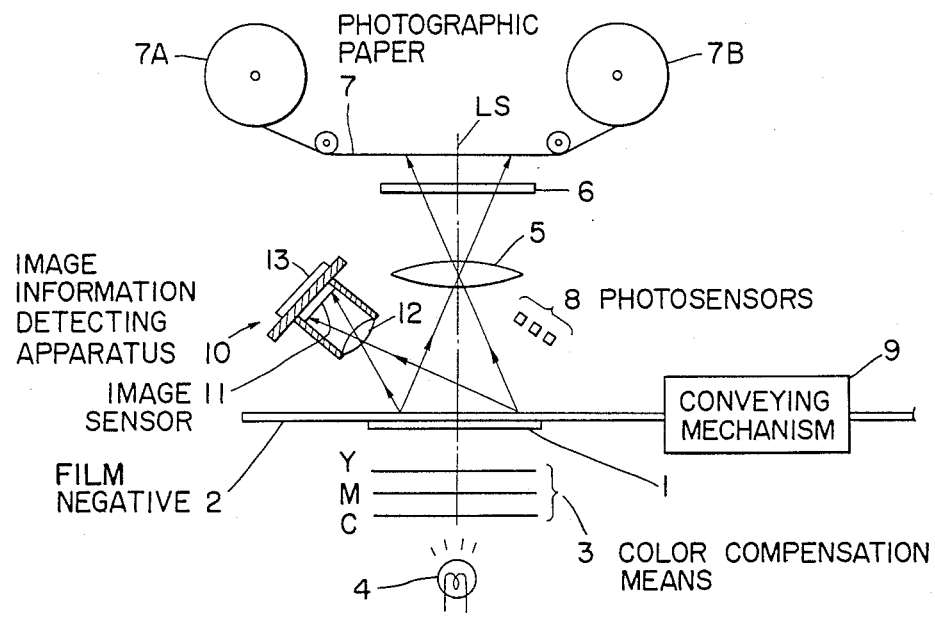
FIG. 1 is a structural view which shows an embodiment of a two-dimensional image sensor applied for image information detection in a photographic printing system.
Figure 2:
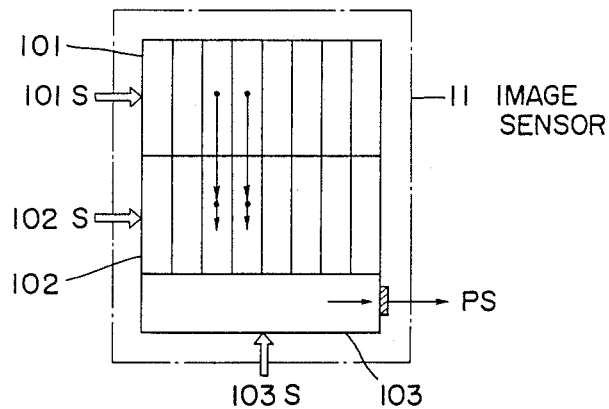
FIG. 2 is a structural view which explains the function of the two-dimensional image sensor.

First of all, the memory address of the data table (1, 2, ..., n×m) is corresponded with the sensor coordinate on the image sensor 11 ((1,1), (1,2), (1,3), ..., (n,m)) as shown in FIG. 11 for each pixel (Step S1). A reference film negative 40 having reference positions marked at the locations SP1 and SP2 (see FIG. 2) is mounted at a predetermined position and photo-metrically scanned (i.e.—measured), and the measured data is stored in a memory A (Steps S2 and S3). In this case, the reference positions are set at the center SP1 of the reference film negative 40 and at a point SP2 where a line passing through the center SP1 crosses a side line. The reference points SP1 and SP2 are marked so as to be detected by the image sensor 11 when it photometrically measures the film in the above mentioned manner. Then the deviation between the position "0" (refer to FIG. 9B) on the sensor coordinate which corresponds to the reference position SP1 on the reference film negative 40 and a reference position (α1,β1) on the deviated sensor coordinates is calculated (Step S4). The deviation (α2,β2) from the other reference point SP2 is calculated (Step S5) and the inclination θ of the sensor coordinate from the frame coordinate is calculated in accordance with the above mentioned expression (2) (Step S6). In this manner, the deviation between the sensor coordinate and the frame coordinate is obtained, coordinates on the frame coordinate for each pixel on the sensor coordinate are calculated by the expression (1) and the thus obtained values are written in the memory B of the data table (Steps S7 and S8). The data table is written-in with frame coordinates corresponding to the memory address as shown in FIG. 11. Such a data table should be prepared in advance.

Figures 5, 6:
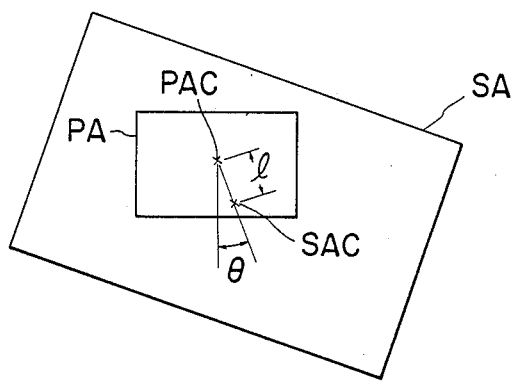
FIG. 5 is an explanatory diagram of the relationship between a sensor area and a frame area.
FIG. 6 is a diagram which explains the deviation therebetween.
Figure 7:
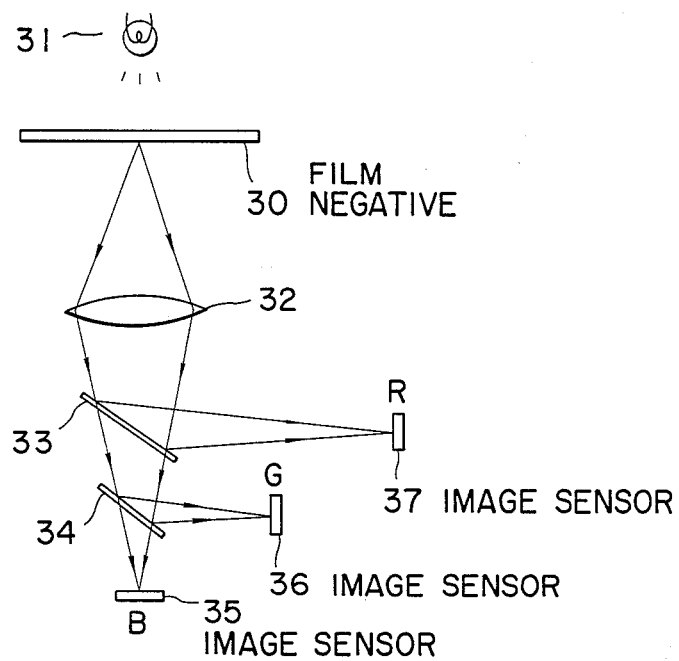
FIGS. 7 and 8 are diagrams which explain color registration.
Figure 8:
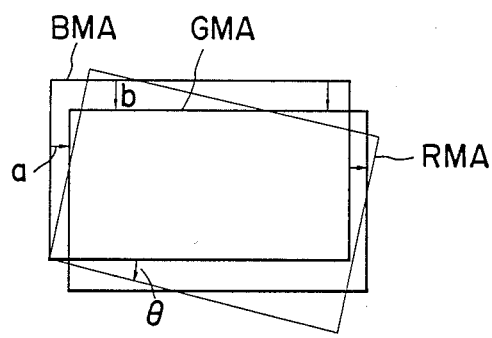

A film negative 2 is mounted at a predetermined position and measured photometrically with the image sensor 11 (Step S9), and the measured data is written-in the memory A (Step S10). The address on the frame coordinate can be learned from the data table and the image data is processed in accordance with the obtained data (Step S11). Such processing is conducted for each of the colors R(red), G(green) and B(blue). Even if an image sensor of a color is deviated from a frame of the film negative as shown in FIG. 6, such a deviation can be automatically corrected in the processing procedure to achieve color registration.

Figure 13:
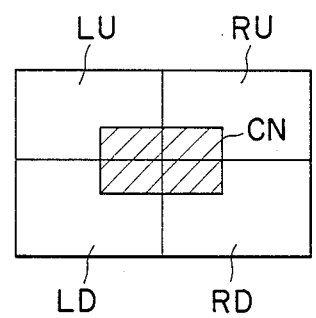
FIG. 13 is a diagram which shows another example of the data table.

Although the data table is re-written for each pixel in the above statement, a data table may be given different numbers for each block (LU, RU, LD, RD, CN) if images are processed in the unit of a block or a segmented unit as shown in FIG. 13. The processing is conducted in this case by transforming the sensor coordinate to the frame coordinate in the same manner as above, and coordinating the values on the frame coordinate to that of block segments.

In the case where the reference film negative is marked at its center for photometric measurement of a reference position, deviation of the mark may make accurate re-writing of data tables impossible. Moreover, the reference film negative should be marked in advance. The aforementioned method may be realized by photometrically measuring an aperture on a film negative carrier with a two-dimensional image sensor, and calculating the reference position automatically. Such an example is shown in FIGS. 14 and 15.

Figure 14:
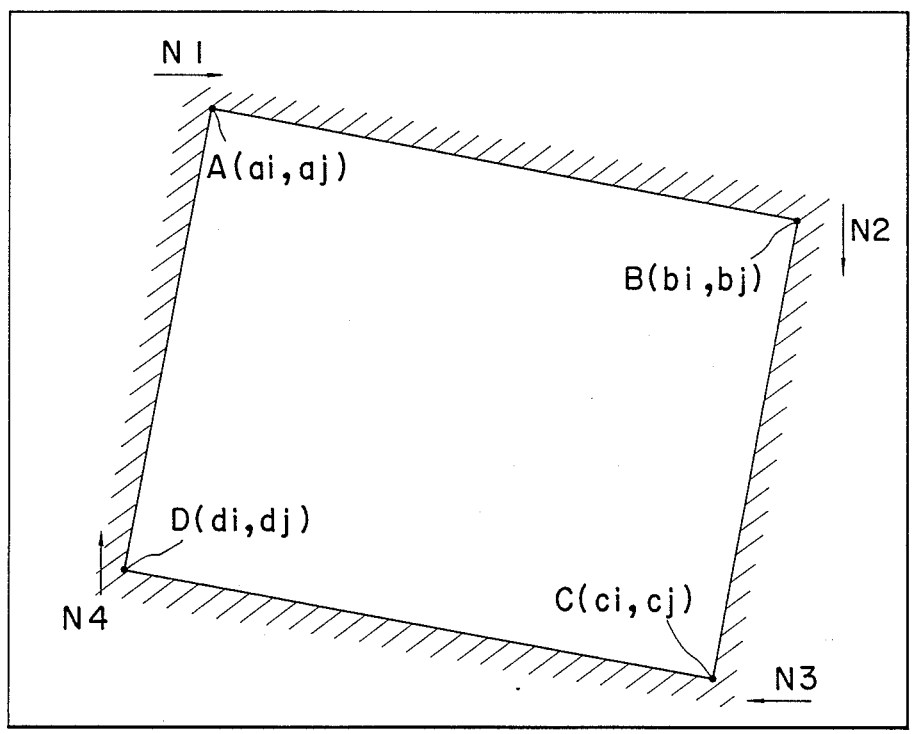
FIGS. 14 and 15 are a diagram and a flow chart which explain the operation of another embodiment according to this invention.
Figure 15:
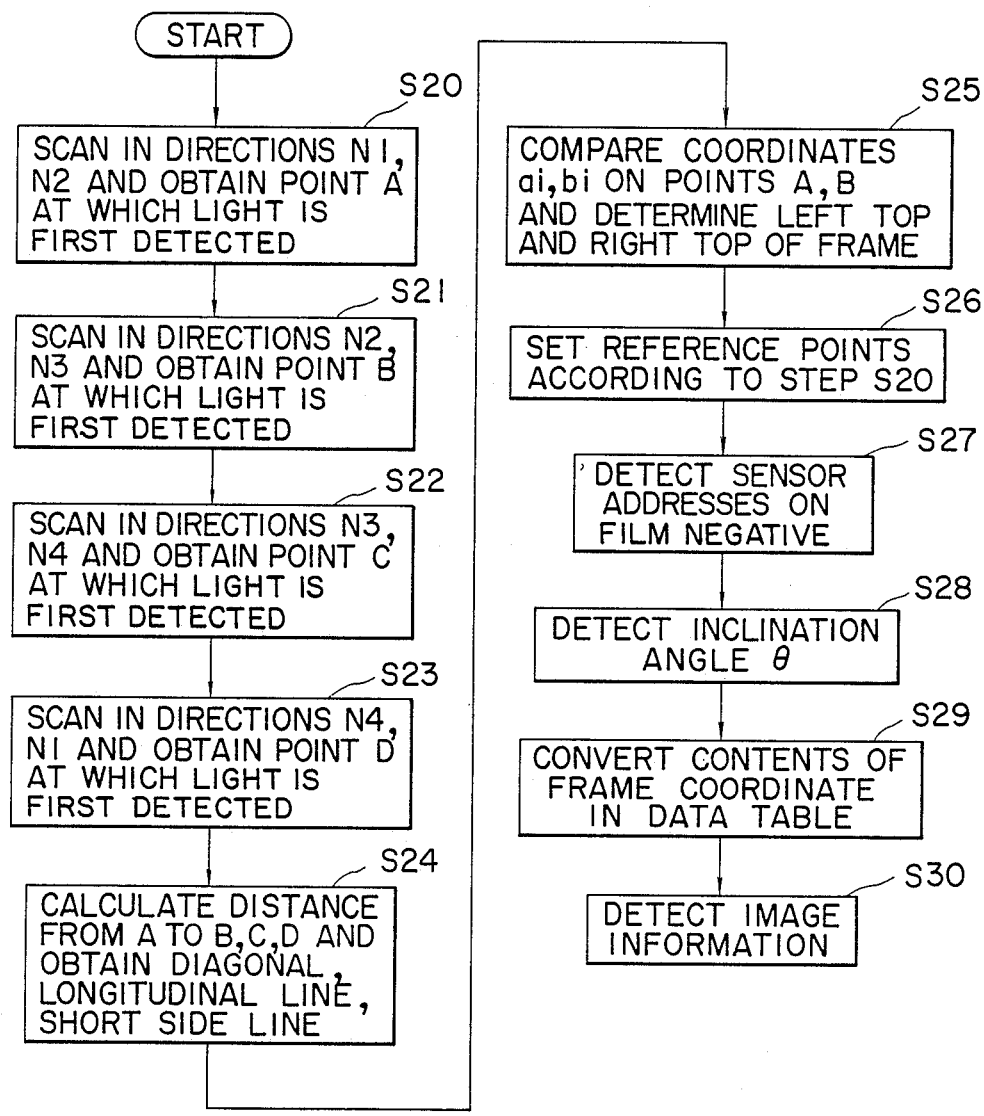

Since the aperture of the film negative carrier is completely included within the area of the two-dimensional image sensor, the four points A(ai,aj), B(bi,bj), C(ci,cj) and D(di,dj) which define four corners of the aperture shown in FIG. 14 are obtained in the following manner. The area is scanned first in the direction of N1 and then in the direction of N2, and the point at which the light is first detected is designated as A(ai,aj) (Step S20). Then it is scanned in the directions N2 and N3, the point at which the light is deflected first is designated as B(bi,bj) (Step S21). It is then scanned in the directions N3 and N4, the point at which the light is first detected is designated as C(ci,cj). Lastly, it is scanned in the directions of N4 and N1, the point at which the light is first detected is designated as D(di,dj) (Step S23). Such a detection of the four points A through D can be obtained by calculation after all the data on the two-dimensional image sensor has been stored in the memory and then read out for calculation. After having obtained the four points A through D, for instance the distances from A to B, C, D are calculated and the longest distance is made a diagonal, the second longest line a longitudinal line and the shortest line a short side line of the aperture (Step S24). The coordinates ai and bi on two points A and B corresponding the longitudinal line are compared and the smaller one is made the point left top of the frame while the bigger one the point right top thereof (Step S25). The two points obtained at the step S20 are made the two points on the top corners of the frame as well as the reference points (Step S26). The sensor addresses of the two reference points on the film negative are detected from the data table (Step S27). The inclination angle θ is detected in accordance with the above expression (2) (Step S28). The deviation and inclination θ from the reference position obtained at the above Step S25 are detected, the contents of the frame coordinate of the data table which have been prepared in advance are converted by the above expression (1)

(Step S29). The image information of a film negative is then detected (Step S30) followed by processing of the image information in accordance with the re-written content of the data table. Since the content of the data table has already been converted to the address without inclination nor deviation, even if image sensors are deviated or inclined from the film negative, the images can be constantly processed in the right relation shown in FIG. 9A. In photometrically measuring the aperture of the film negative carrier with the image sensor 11, since the direction of the film negative carrier is already in correspondence with both of the feeding directions of the film, the data table can be re-written and at the same time, the feeding direction of the film is automatically detected for appropriate processing. The size of the aperture on the film negative carrier can be detected to discriminate the size of the film negative automatically.

Although the above description was made for detection of images on the film negative, the same method is applicable for a positive film. The two-dimensional image sensors are described in the foregoing statement, but a line sensor may be used and moved relative to the film.

According to this invention as described in detail in the above statement, since the deviation between image sensor coordinate and actual frame coordinate is detected in preparing a data table, and since the sensor address of pixel data detected with the image sensor is converted to the frame address with the thus prepared data table to automatically correct the positional deviation of the image sensor, minute mechanical adjustments and an adjustment mechanism become unnecessary so as to thereby simplify the system as well as to reduce the cost. Even if the image sensor of one or more colors are positionally deviated or inclined from the film negative, image processing can be conducted in the proper relationship shown in FIG. 9A according to this invention method for color registration.

Figure 16A:
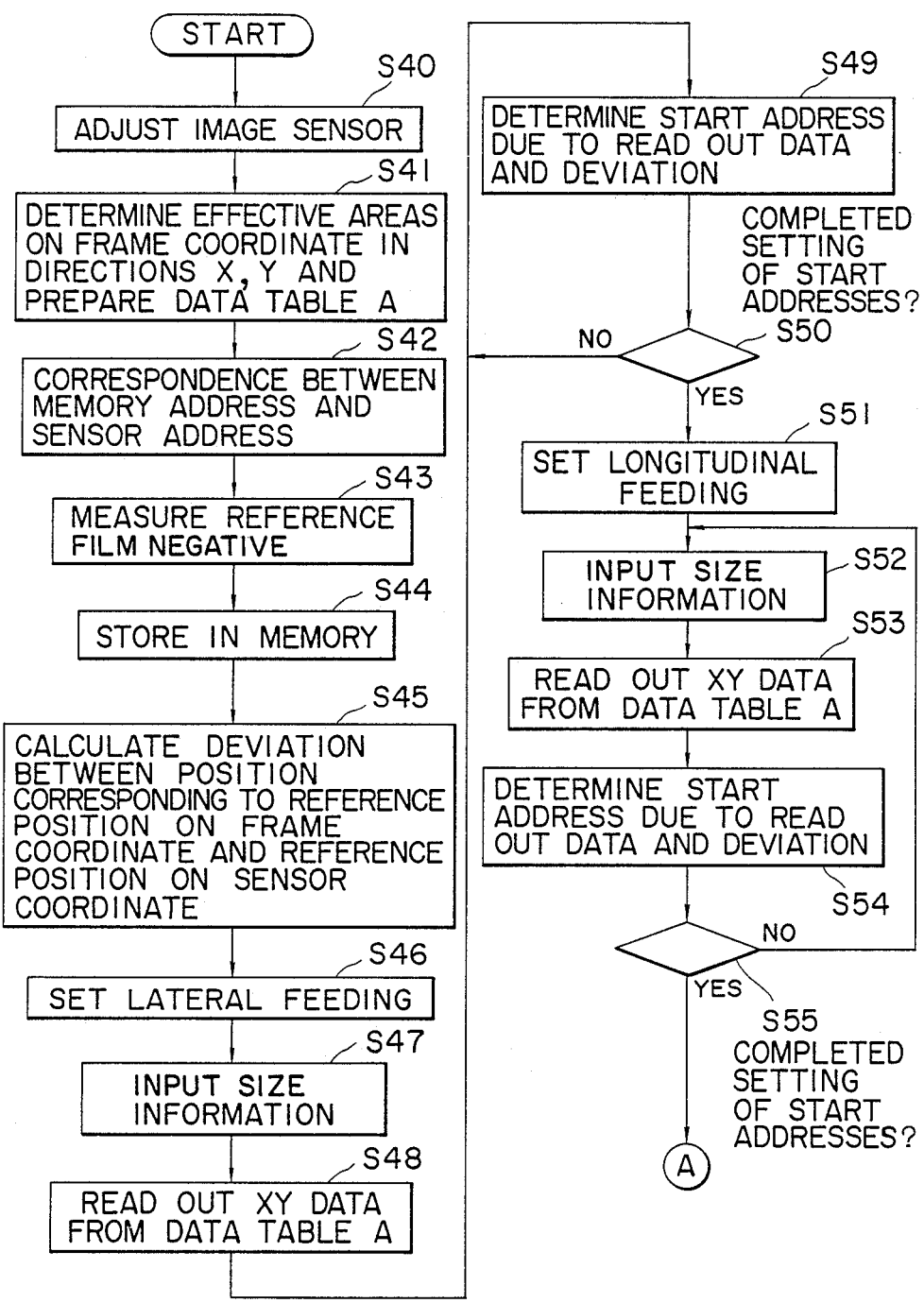
FIGS. 16A and 16B are flow charts which show an example of operation according to this invention.
Figure 16B:
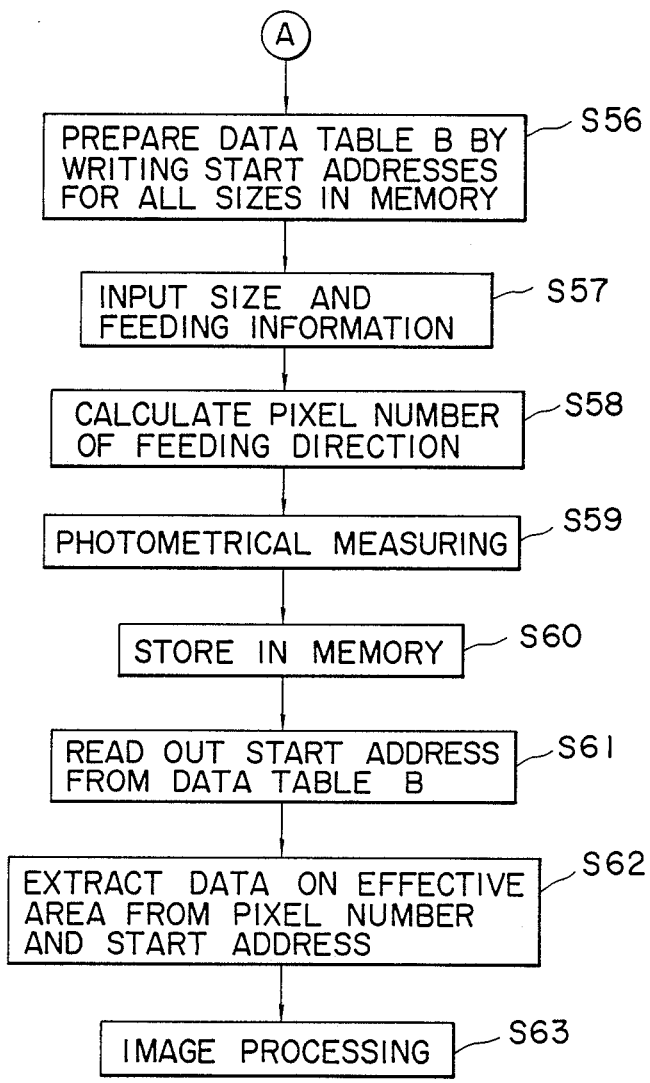

The aforementioned statement concerned the case where an image sensor is inclined by the angle $\theta$ from a film negative. If there is no inclination, the operation will be conducted as below; a reference position is determined at an appropriate location in the image area by means of a reference film negative. The images on the film are photometrically measured by a two-dimensional image sensor to automatically correct the positional deviation of the sensor area from the amount of deviation in the XY-directions (longitudinal/lateral) on the location corresponding to the reference position. A data table is prepared in advance to indicate the start address where the data on a point which is to be scanned first or a specific point such as the left top point of an effective frame area of all the types of frames including those for longitudinal and lateral feedings. When the film negative is photometrically measured, images are processed in accordance with the start address on the frame coordinates obtained by referring to the data table. The number of reference position may be one as in this case (such as in the center of frame), the deviation in the directions X and Y (longitudinal and lateral) alone should be corrected. The invention will now be explained in reference to the flow charts in FIGS. 16A and 16B.

Figure 18:
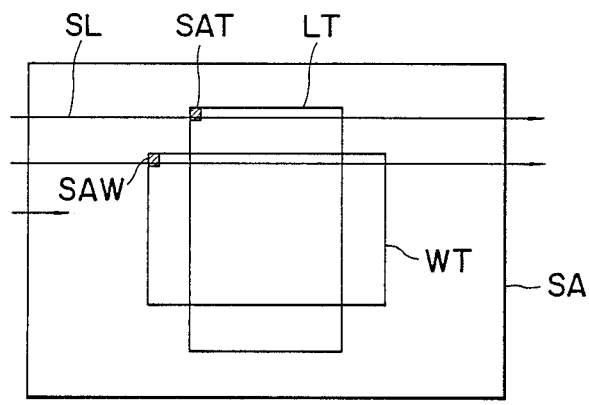
FIG. 18 is an explanatory diagram of a start address.
Figure 19:
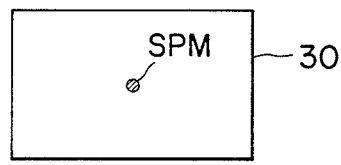
FIG. 19 is a diagram which explains the reference position.

An image sensor (image information detecting device) is adjusted so as not to cause deviation from the film negative at the printing section (Step S40). Effective areas are determined on the frame coordinate in directions X and Y for respective sizes of the film negative, and a data table A with memory address and sensor coordinate is prepared as shown in FIG. 17 (Step S41). The effective areas correspond to the lengths in directions X and Y (longitudinal and lateral directions) of the film negative. Since there is no inclination from the image sensor, a point to the left and above the scanning lines SL, for instance, is designated as start addresses SAT and SAW as shown in FIG. 18. The areas both for longitudinal and lateral feeding can be determined for each size on the sensor area SA of the image sensor. As shown in FIG. 17, the memory address on the data table A $(1,2,3,\ldots,n\times m)$ corresponds to the sensor coordinate of the image sensor 11 $((1,1), (1,2), (1,3), \ldots, (n,m))$ for each pixel (Step S42). A reference film negative 30 having a mark SPM at the central reference position as shown in FIG. 19 is mounted at a predetermined position and photometrically measured with the image sensor and the obtained data thereof is stored in a memory (Steps S43 and S44). Then, the deviation between a position on the reference film negative 30 corresponding to the sensor coordinate on the reference position SPM if there is no deviation between the sensor coordinate and the frame coordinate and corresponding to the reference position on the sensor coordinate, if there is a deviation, is calculated (Step S45). By this processing, the deviation amount in the directions X and Y between the image sensor and the film negative is obtained and based upon the thus obtained deviation amount, the start address as shown in FIG. 18 is set for the lateral and longitudinal feeding of the film negative for each size. More particularly, the printer is set in the lateral feeding mode first (Step S46), and size information of the film negative is inputted in an appropriate sequence (Step S47). Size information may be inputted from a keyboard in a predetermined sequence such as 135 size→110 size→126 size→disc. Since the size or the effective area of the film negative of the size inputted just now is known, the XY data on the inputted size from the data table A is read out (Step S48), and the start address of this inputted size is obtained due to the read out data and calculated deviation in the lateral feeding and then stored in a memory (Step S49). The start address is set for all the sizes in lateral mode repeatedly (Step S50). Similar processing is repeated for longitudinal feeding (Steps S51 through S55). Start addresses for all the sizes are written in the memory (Step S56) to prepare the data table B as shown in FIG. 17. The data table B thus stores the start addresses for each size and for both longitudinal and lateral feeding. Once an appropriate start address is detected, the lateral feeding area WT and longitudinal feeding area LT can be obtained based upon the input size as shown in FIG. 18.

A sheet of film negative 2 is mounted at a predetermined position to be photometrically measured with the image sensor 11. At the same time, size information and mode information on the direction of feeding are manually inputted from outside (Step S57). This information on the size and the direction of feeding may be detected by photometrically measuring the unexposed areas of the film negative or the film negative carrier with the image sensor (by the methods disclosed in Japanese Pat. Application Nos. 7534/1984 and 79407/1985), and automatically inputted. The number of pixels in the longitudinal and lateral directions on the film negative is calculated by referring to the data table A (Step S58), then the film negative is photo-metrically measured as above (Step S59) and the obtained data is stored in a memory (Step S60). Then, the start address data (positional information) corresponding thereto is read out from the data table B (Step S61), and the data on the effective area on the memory is extracted from the number of pixels obtained at the step S58 (Step S62) and the readout start address to carry out the processing of the image data (Step S63). Thanks to these processing, even if the image sensor program deviates from the film negative frame in the directions of XY, the data can be processed in a manner so to automatically correct such deviation.

According to this invention, the amount of deviation between the image sensor coordinate and the frame coordinates is detected, and the data tables are prepared with start addresses set respectively for each size and each feeding direction to automatically and rapidly correct positional deviation of the image sensor based upon the start addresses presently set on the data tables for both longitudinal and lateral sizes. Since fine mechanical adjustment becomes unnecessary, the method does not need an adjustment mechanism and can be conveniently reduced in cost.

It should be understood that many modifications and adaptations of the invention will become apparent to those skilled in the art and it is intended to encompass such obvious modifications and changes in the scope of the claims appended hereto.

What is claimed is:

1. A method for detecting/processing image information comprising the steps of:
    receiving light from images with an image sensor;
    digitally detecting, on a pixel by pixel basis, image information data of an entire area through which said image sensor receives light;
    storing said information data in a memory;
    processing said stored information data, wherein memory addresses of tables containing said information data are made to correspond with sensor coordinates of said image sensor;
    photometrically measuring a reference film negative having a mark at a frame reference position;
    calculating the amount of deviation between (a) a sensor coordinate which corresponds to said frame reference position, and (b) a reference coordinate of said sensor;
    calculating values of frame coordinates corresponding to each pixel point of said sensor coordinates;
    writing said values in said data information tables;
    photometrically measuring said images and storing information corresponding thereto in said memory; and simultaneously,
    processing said image information in accordance with said memory addresses of said frame coordinates obtained by referring to said data information tables;
    wherein said images and said image sensor are fixed, and reading out area of said memory is operatively variable.

2. A method for detecting/processing image information as claimed in claim 1, wherein said frame reference position is set at one point and said deviation in the longitudinal and lateral directions is corrected based on said set point.

3. A method for detecting/processing image information as claimed in claim 1, wherein two frame reference positions are set and said deviation in the longitudinal and lateral directions as well as inclination are corrected based on said two frame reference positions.

4. A method for detecting/processing image information as claimed in claim 1, wherein said frame reference position is automatically obtained by photometrically measuring an aperture of a film negative carrier.

5. A method for detecting/processing color image information comprising the steps of:
    receiving light from images with an image sensor;
    digitally detecting, on a pixel by pixel basis, image information data of an entire area through which said image sensor receives light;
    storing said information data in a memory;
    processing said stored information data, wherein memory addresses of tables containing said information data are made to correspond with sensor coordinates of said image sensor;
    photometrically measuring a reference film negative having a mark at a frame reference position;
    calculating the amount of deviation between (a) a sensor coordinate which corresponds to said frame reference position, and (b) a reference coordinate of said sensor;
    calculating values of frame coordinates corresponding to each pixel point of said sensor coordinates;
    writing said values in said data information tables;
    photometrically measuring said images and storing information corresponding thereto in said memory; and simultaneously,
    processing said image information in accordance with said memory addresses of said frame coordinates obtained by referring to said data information tables;
    wherein said frame reference position is automatically obtained by photometrically measuring an aperture of a film negative carrier.

6. A method for detecting/processing image information comprising the steps of:
    separating light containing all colors from color images into separate beams of monochromatic light of plural colors;
    respectively receiving said separate light beams with plural image sensors;
    digitally detecting, on a pixel by pixel basis, image information data of an entire area through which said image sensors receive light;
    storing said information data in a memory;
    processing said stored information data, wherein memory addresses of tables containing said information data are made to correspond with sensor coordinates of respective said image sensors;
    photometrically measuring a reference film negative having a mark at a frame reference position;
    calculating the amount of deviation, for each sensor, between (a) a sensor coordinate which corresponds to said frame reference position, and (b) a reference coordinate of said sensor;
    calculating values of frame coordinates corresponding to each pixel point of said sensor coordinates;
    writing said values in said data information tables;
    photometrically measuring said images and storing information corresponding thereto in said memory; and,
    processing said image information in accordance with said memory addresses of said frame coordinates obtained by referring to said data information tables;
    wherein said frame reference position is automatically obtained by photometrically measuring an aperture of a film negative carrier.

7. A method for detecting/processing color information as claimed in claim 6, wherein said color images are fixed and said image sensors are movable relative to said color images.

8. A method for detecting/processing color image information as claimed in claim 6, wherein said frame reference position is set at one point and said deviation in the longitudinal and lateral directions is corrected based on said set point.

9. A method for detecting/processing color image information as claimed in claim 6, wherein two frame reference positions are set and said deviation in the longitudinal and lateral directions as well as inclination are corrected based on said two frame reference positions.

10. A method for detecting/processing color image information as claimed in claim 6, wherein said sensors and said images are fixed, and reading out area of said memory is operatively variable.

11. A method for detecting/processing image information comprising the steps of:
 receiving light from images with an image sensor;
 digitally detecting, on a pixel by pixel basis, image information data of an entire area through which said image sensor receives light;
 storing said information data in a memory;
 processing said stored information, wherein memory addresses in a first information data table correspond with sensor coordinates of said image sensor;
 photometrically measuring a reference film negative having a mark at a frame reference position;
 calculating the amount of deviation between (a) a sensor coordinate which corresponds to said frame reference position, and (b) a reference coordinate of said sensor;
 reading out positional data on size information from said first information data table for each feeding direction and for each size;
 obtaining start addresses, where a specific point on an effective area for each case is stored, from said calculated amount of deviation;
 writing said start addresses in a second information data table;
 photometrically measuring said images and storing information corresponding thereto in said memory in case of ordinary measurement;
 processing said images in accordance with said start addresses of said frame coordinate obtained by referring to said second data table;
 wherein said images and said image sensor are fixed, and reading out area of said memory is operatively variable.

* * * * *